(12) United States Patent
Bevente et al.

(10) Patent No.: US 7,321,656 B2
(45) Date of Patent: Jan. 22, 2008

(54) SHARED USAGE TELECOMMUNICATIONS BILLING SYSTEM AND METHOD

(75) Inventors: Guy Bevente, Wayne, IL (US); Michael Thane Paquette, Chesterfield, MO (US); Gregg R. Koeppen, Grafton, WI (US); Douglas Robert Moran, Danville, CA (US); Danny Lee Roper, Grover, MO (US); Kimberly Renee Wolken, Concord, CA (US); Jennifer Lynn Anderson, Chicago, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 442 days.

(21) Appl. No.: 10/655,576

(22) Filed: Sep. 4, 2003

(65) Prior Publication Data

US 2005/0053211 A1    Mar. 10, 2005

(51) Int. Cl.
*H04M 15/00* (2006.01)
*H04M 11/00* (2006.01)

(52) U.S. Cl. .............................. 379/121.02; 379/115.01; 379/115.02; 455/406

(58) Field of Classification Search ........... 379/115.01, 379/115.02, 114, 121.02; 455/405, 406
See application file for complete search history.

(56) References Cited

U.S. PATENT DOCUMENTS

| | | | |
|---|---|---|---|
| 6,556,818 B1 * | 4/2003 | Meehan ...................... | 455/406 |
| 6,615,034 B1 * | 9/2003 | Alloune et al. ............. | 455/406 |
| 6,965,764 B2 * | 11/2005 | Plush et al. ................. | 455/406 |
| 2002/0026393 A1 | 2/2002 | Mattson et al. | |
| 2002/0198835 A1 | 12/2002 | Watson | |
| 2003/0045267 A1 * | 3/2003 | Himmel et al. ............. | 455/406 |
| 2004/0224661 A1 * | 11/2004 | Pericas et al. .............. | 455/406 |

OTHER PUBLICATIONS

SBC/SBC LD/Cingular—CRI/MIAMI Market Trial (Mid 2003) SBCLD Usage Aggregator—Vision; Controlled Rollout/Launch—Scope; pp. 1-4.
www.xchangemag.com/hotnews/36h5111422.html; "SBC, BellSouth to Unveil Shared Minutes Bucket"; Jul. 11, 2003; pp. 1-3.
http://www.bizjournals.com/memphis/stories/2003/06/02/daily23.html, "BellSouth, SBC, Cingular Team Up for Shared Minutes Plan," Memphis Business Journal, Jun. 6, 2003, pp. 1-3, anthor unkown.

* cited by examiner

*Primary Examiner*—Barry Taylor
(74) *Attorney, Agent, or Firm*—Toler Law Group, Intellectual Properties

(57) ABSTRACT

In a particular embodiment, the disclosure is directed to a telecommunications billing system that includes an interface, a customer database, a usage database and a billing module. The interface is configured to receive subscription data associated with a subscription and a first set of telecommunications service usage data. The subscription data identifies a pricing plan that includes an allotment of shared telecommunications units for use in connection with at least one of the first telecommunications service and a second telecommunications service. The usage database is configured to store the first set of telecommunications service usage data and a second set of telecommunications service usage data. The billing module is configured to access the usage database and the customer database. The billing module is to generate billing data utilizing the allocation of shared telecommunications units, the first set of telecommunications service usage data and the second set of telecommunications service usage data.

17 Claims, 11 Drawing Sheets

SHARED USAGE TELECOMMUNICATIONS BILLING SYSTEM AND METHOD

FIELD OF DISCLOSURE

This disclosure, in general, relates to telecommunications billing systems and methods for providing an invoice with shared services usage.

BACKGROUND

The telecommunications industry has developed a broad set of telecommunications products and services to address customer demand while operating in a stringent regulatory environment. As a result, diverse products are offered by many different companies, often operating in an uncooperative environment.

This uncooperative environment harms consumers as they are required to interact with multiple entities for different services. In addition, consumers pay for telecommunications services through multiple channels, such as for example, a consumer may have a local phone bill, a long distance bill, and a cellular bill, each from different providers. Moreover, consumers are often forced to select fixed plans instead of telecommunications offerings customized to the consumer's particular usage patterns.

In addition, while a splintered set of companies have difficulty in efficiently and cost effectively providing various telecommunications services to customers, while individual companies often have limited ability to provide a full range of services as a result of costs or regulatory limitations. A result of this environment is that telecommunications customers often receive many different bills for the various different services, leading to increased costs and customer inconvenience.

Therefore, an improved system and method for providing telecommunications services and associated invoices would be desirable.

DETAILED DESCRIPTION OF THE DRAWING(S)

Figure 1:
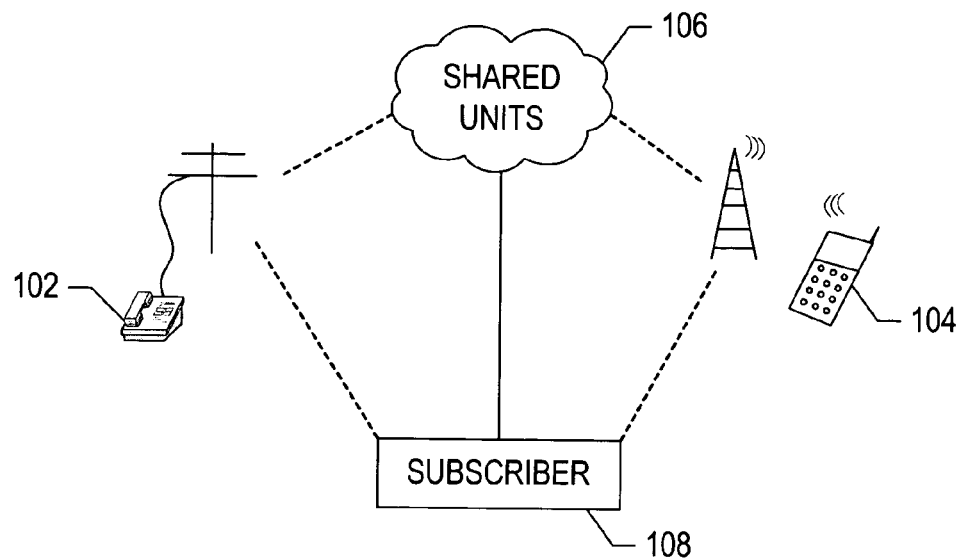
FIGS. 1 and 2 depict an exemplary telecommunications services usage environment.

FIG. 1 depicts an exemplary system for providing telecommunications services. This particular example shows two telecommunications services 102 and 104. A subscriber 108, subscribes to each of the telecommunications services 102 and 104. The subscriber 108 is also linked to a set of shared units 106. These shared units are allotted to the user for use in connection with at least one of the two telecommunications services. As the two telecommunications services are used, units from the set of shared units are allocated to account for usage by the subscriber of the two telecommunications services 102, 104.

The telecommunications services 102 and 104 are distinct from each other. In this exemplary embodiment the distinct telecommunications services are a landline service 102 and a wireless service 104. As the subscriber 108 utilizes these telecommunications services 102 and 104, usage is deducted from the allotted set of shared units 106. Various distinct telecommunications services may be utilized in conjunction with shared telecommunications units 106, such as, calling card services, long distance services, internet services, and wireless services.

The shared telecommunications units 106 may take various forms, such as, minutes, usage equivalents, various increments of time, or monetary allotments. Usage of a telecommunications service may, for example, be deducted minute for minute. In another embodiment, usage may be allocated based on a unit equivalent such as one minute of long distance equals one unit equivalent while two minutes of wireless service equals one unit equivalent.

The shared telecommunications units may be further subdivided into allotments for use in connection with usage during a certain period of time, time of day, usage subject to greater expense, or usage subject to greater demand. In one exemplary embodiment, a set of shared telecommunications units may be supplied for use of either distinct telecommunications service 102 or 104 at any time during the day. Other allotments may be provided for shared usage during specific times of day or for exclusive usage of one of the two telecommunication services, 102 or 104, at a given time of day (e.g. nights and weekends).

Allotments of shared units may be provided periodically such as in conjunction with a monthly service plan. Availability of shared units may expire. In another embodiment, subsequent allotments of shared units may be added to previously unused shared units. Usage of services beyond or in excess of the allotment of shared telecommunications units 106 may be prohibited or charged on a per unit basis. The per unit basis may be different for each of the telecommunication services 102 or 104.

Figure 2:
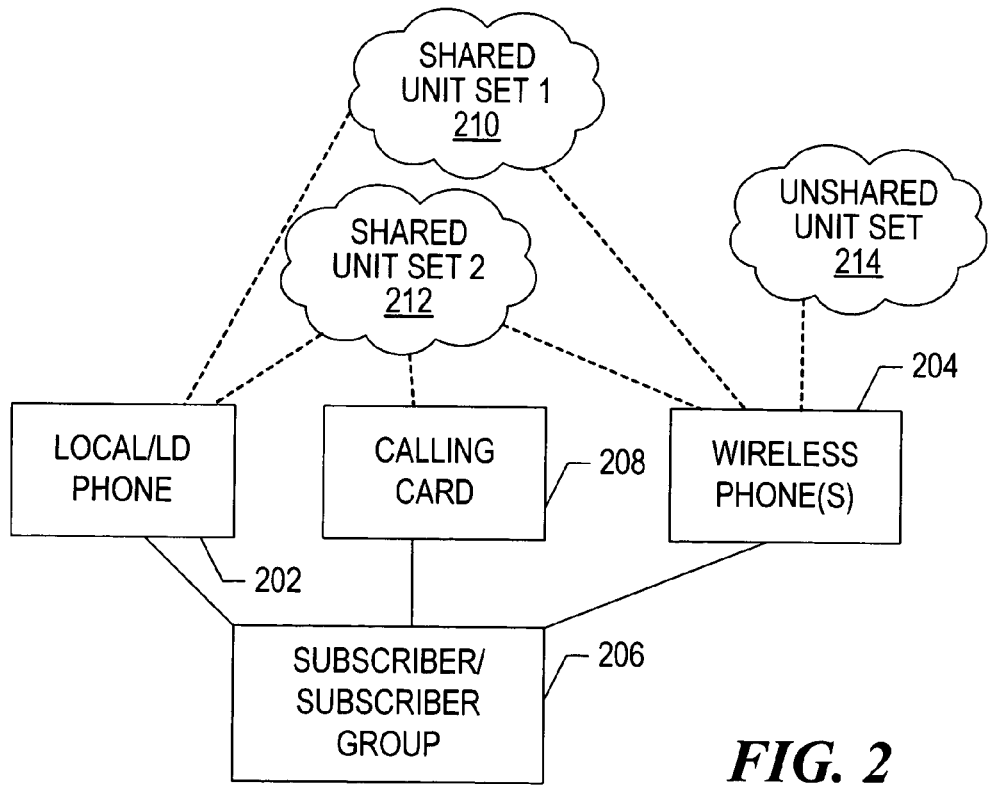

FIG. 2 depicts another embodiment of a system for allocating telecommunications service. In this exemplary embodiment, the subscriber or subscriber group 206, subscribes to various telecommunication services, such as local landline and long distance service 202, a calling card service 208, and a wireless phone service 204. The subscriber or subscriber group 206 may participate in a pricing plan or subscriber package that includes an allotment of shared telecommunications units 210. The subscriber package or pricing plan may further include a second allotment of shared units 212 and one or more allotments of unshared units such as unshared unit set 214.

The subscriber or subscriber group 206 may, for example, be a family, a business, or a group of individuals utilizing telecommunication services. The subscriber or subscriber group 206 may, for example, have one or more local landline phones or telephone lines, each having an associated long distance service. Subscriber group 206 may further have one or more calling cards 208 and several wireless phones 204. In this exemplary embodiment, the subscriber package or pricing plan permits charges for usage based on the allotment of shared telecommunications units and unshared telecommunications units.

In one exemplary embodiment, per minute usage of landline long distance telephone service 202 and per minute usage of wireless phone service 204 is included in a monthly service plan up to a cumulative total of the shared telecommunications units. Usage beyond the cumulative total of the allotment of shared telecommunications units incurs additional fees or charges. These additional fees may be calculated using a common per unit rate common to each of the telecommunications services or a different rate for each of the telecommunication services.

The shared telecommunications units may be subdivided into one or more groups. In this exemplary embodiment two sets of telecommunications units 210 and 212 are shown. For example, one set of shared telecommunications units 210 may be allotted for telecommunications usage during specific time periods, during peak usage or at any time during the day. The second set of telecommunications units 212 may be utilized at other time periods such as off peak or night and weekend periods. In one exemplary embodiment, units of the shared unit set 210 may be allocated to usage of the various telecommunications services until the cumulative usage of the various telecommunications services exceeds the first set of shared units 210. Subsequently, additional usage of the various telecommunications services used during specific time periods, such as during off peak time periods, may be allocated units from the second shared unit set 212. However, peak usage in excess of the allotted shared units set 210 may incur additional charges. These additional charges may be calculated using a per unit rate common to the various telecommunications services. Alternately, the additional charges may be calculated using the distinct rates for usage of each of the different telecommunications services.

In an alternate embodiment, one or more of the various telecommunications services may have additional units allotted for individual usage. For example, a set of unshared units 214 is shown in FIG. 2 as being allotted for use of the wireless phone service 204 but not for the other services 202, 208. These unshared units 214 may be utilized prior to the utilization of the shared units, after exhaustion of the shared unit allocations, or through the application of business logic specifying how usage of a telecommunications service is to be allocated. Furthermore, usage of the shared telecommunications units may be subject to additional business logic or limitations. For example, usage of the shared telecommunications units may be limited by usage ratios, minimum or maximum usage of individual telecommunications services, and other formulaic limits for insuring that usage of one of the services does not significantly exceed or account for an excess portion of the shared telecommunications units. For example, the shared telecommunications units 210 may be allocated to usage of long distance landline and wireless telecommunications services provided that usage of either the landline long distance service or wireless service does not exceed a two to one ratio of units.

The pricing plan or subscriber package may further include business logic for applying the shared telecommunications units to usage of each of the telecommunications services. In one exemplary embodiment, usage of the shared telecommunications units is applied based on when the usage occurs. For example, as each unit is used in conjunction with either a long distance landline service or a wireless service, the unit is subtracted from the allotment of shared telecommunications units. Upon exhaustion of the allotment of shared telecommunications units, additional fees are incurred based on a per unit charge which may be distinct for each of the telecommunications services. In an alternate embodiment, all usage of one telecommunications service may be allocated units from the telecommunications shared units before the second service is allocated units. Excess charges are then incurred at a rate determined by the second telecommunications service. For example, units from the allocation of shared telecommunications units may first be allocated to usage of the landline long distance telecommunications service. Then, any remaining units of the allocation of shared telecommunications units may be allocated to usage of the wireless telecommunications service. Charges for usage in excess of the allotted shared telecommunications units would be incurred at a rate specific to the wireless telecommunications service rate. However, various business logic or formulas may be applied to the allocation of shared telecommunications units.

Figure 3:
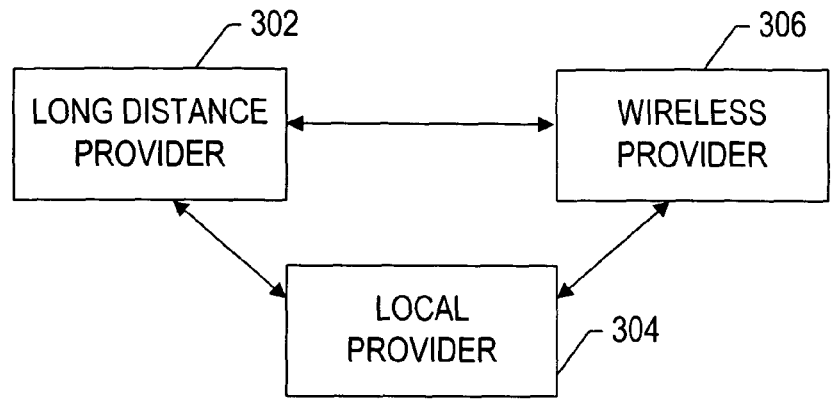
FIG. 3 depicts an exemplary telecommunications service provider environment.

FIG. 3 depicts an exemplary system for providing an allotment of shared telecommunications units and an invoice or bill associated with usage of that allotment and applicable services. In a complex regulatory environment, telecommunications providers are generally subdivided by the type of telecommunications service provided. In some cases, one telecommunications service provider may provide several telecommunications services, but not others. In this exemplary embodiment, distinct entities provide different telecommunications services. These distinct entities may be individual companies, subdivisions of a larger company, or a combination of each. Each entity provides its service but must account for that service and provide invoices in conjunction with other entities.

In this exemplary embodiment, a long distance telecommunications provider 302, a local landline service provider 304, and a wireless telecommunications provider 306 interact to establish accounts for each of their associated telecommunications services to i) draw from the shared allotment of telecommunications units, ii) modify those accounts, iii) provide invoices to subscribers associated with those accounts, and iv) reconcile the usage and allocations of monies acquired through invoicing. In one exemplary embodiment, the local service provider 304 may receive an order for a specific price plan or subscriber package that includes shared telecommunications units. This order or subscriber package may further include a request for wireless service and landline long distance service. The local landline service provider may transmit this information to the wireless service provider 306 and to the landline long distance service provider 302. In one exemplary embodiment, the landline long distance service provider 302 is responsible for managing the allocation of shared telecommunications units. In this case, the long distance landline service provider 302 interacts with the wireless telecommunications provider 306 to exchange information and associate subscriber usage of the wireless telecommunications service provided by the wireless service provider 306 with long distance usage provided by the long distance landline service provider 302. The long distance service provider 302 and the wireless provider 306 may further interact to exchange usage data, reconcile data, modify accounts, and exchange monies.

In a further exemplary embodiment, the local landline service provider 304 may provide a unified invoice or bill to subscribers. This unified invoice or bill may include information about the allocation of the shared telecommunications units, long distance landline service usage, wireless service usage, local charges, taxes for each of the individual telecommunications services, equipment charges associated with one or more of the telecommunications services, and other charges. In this exemplary embodiment, the wireless service provider 306 may transfer usage information to the long distance service provider 302. The long distance service provider 302 provides the local service provider 304 with an accounting of the wireless usage and long distance usage in relation to the shared telecommunications units. The long distance provider 302 may further provide invoice data associated with usage in excess of the allotted shared telecommunications units, taxes associated with the long distance provider, and other charges. The wireless provider 306 may provide the local service provider 304 with invoice data such as equipment charges or taxes. The local service provider 304 may incorporate the invoice data from the long distance landline service provider 302 and the wireless telecommunications service provider 306 into a unified bill that includes charges associated with local telecommunications services. This bill may be sent or transmitted to the subscriber using an electronic method such as email or a website or a paper method such as a mailed bill.

The bill may alternately be provided by the long distance landline service provider 302 or the wireless telecommunications provider 306. In alternate embodiments, the local service provider 304 or wireless service provider 306 may act to manage and allocate the shared telecommunications units.

In the particular embodiment described in relation to FIG. 3, the local service provider 304 provides a bill and receives an order for a service plan. The long distance service provider manages the shared telecommunications units. Each entity is responsible for providing the associated telecommunications services. FIGS. 4, 5, 6 and 7 depict exemplary methods for providing telecommunications services in connection with the shared telecommunications units.

Figure 4:
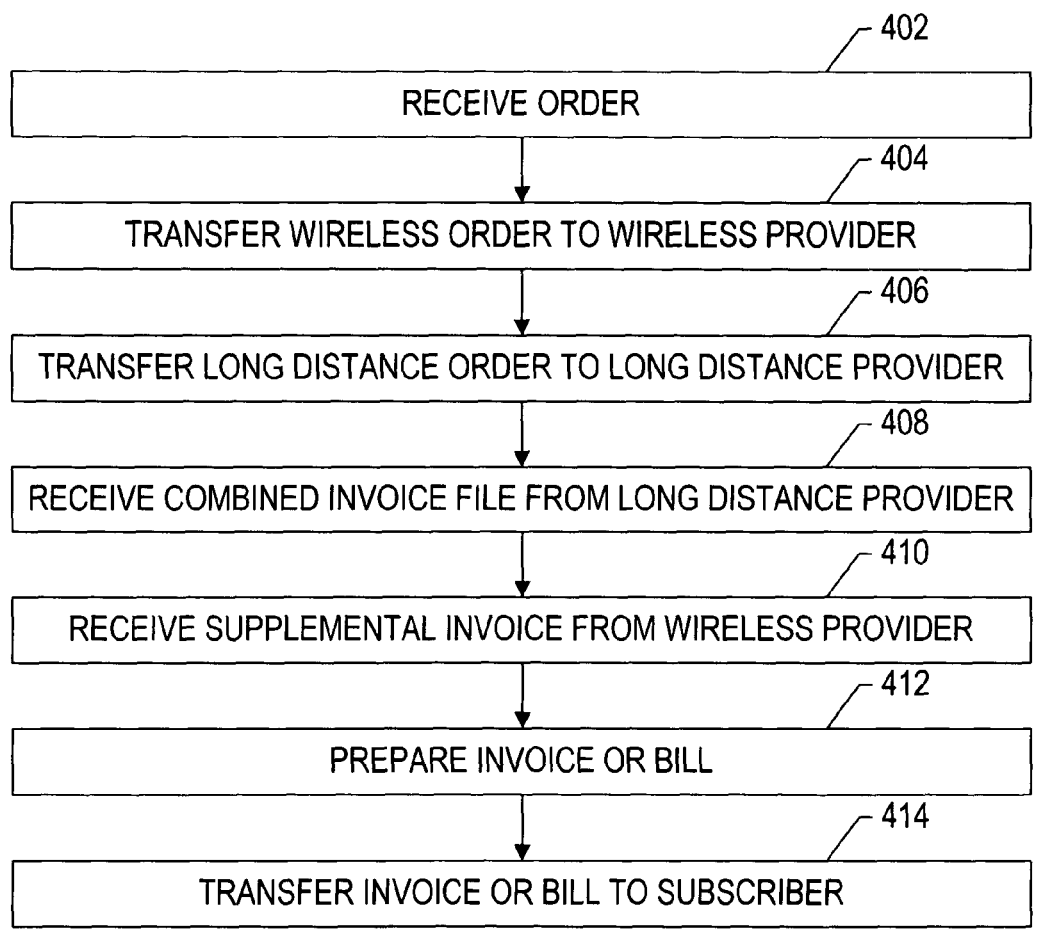
FIGS. 4, 5, 6 and 7 depict exemplary methods for use in the exemplary telecommunications services provider environment.

FIG. 4 depicts an exemplary method for managing the provision of telecommunications services in conjunction with shared telecommunications units. An entity may receive an order as shown at step 402. The entity may, for example, be a local landline telecommunications service provider. The order may be associated with a subscription for local landline, long distance landline, and wireless telecommunications services. The order may further include a pricing plan that includes shared telecommunications units.

The entity may transfer order data associated with wireless telecommunications services to the wireless provider, as shown at step 404. The ordered data may include information about the pricing plan that is associated with shared telecommunications units and may be used in conjunction with establishing a new wireless telecommunications service or modifying an existing account. The entity may also transfer order data to a long distance service provider, as shown at step 406. The order data may identify the pricing plan. The wireless service provider and the long distance service provider may interact to establish accounts and manage usage in relation to the shared telecommunications units.

The entity may then receive a combined invoice file from the long distance service provider or the wireless service provider. In this particular embodiment, the billing entity receives a combined invoice file from the long distance service provider, as shown at step 408. The billing entity may then receive supplemental invoice data from the wireless service provider, as shown at step 410. This supplemental invoice data may include charges unrelated to the shared telecommunications units such as equipment charges and taxes.

The billing entity may prepare an invoice or bill using the combined invoice file and the supplemental invoice data, as shown at step 412. The entity may then transmit or transfer the invoice or bill to the subscriber, as shown at step 414. The entity may mail a paper bill, email an electronic bill, or provide an electronic statement on a website.

Figure 5:
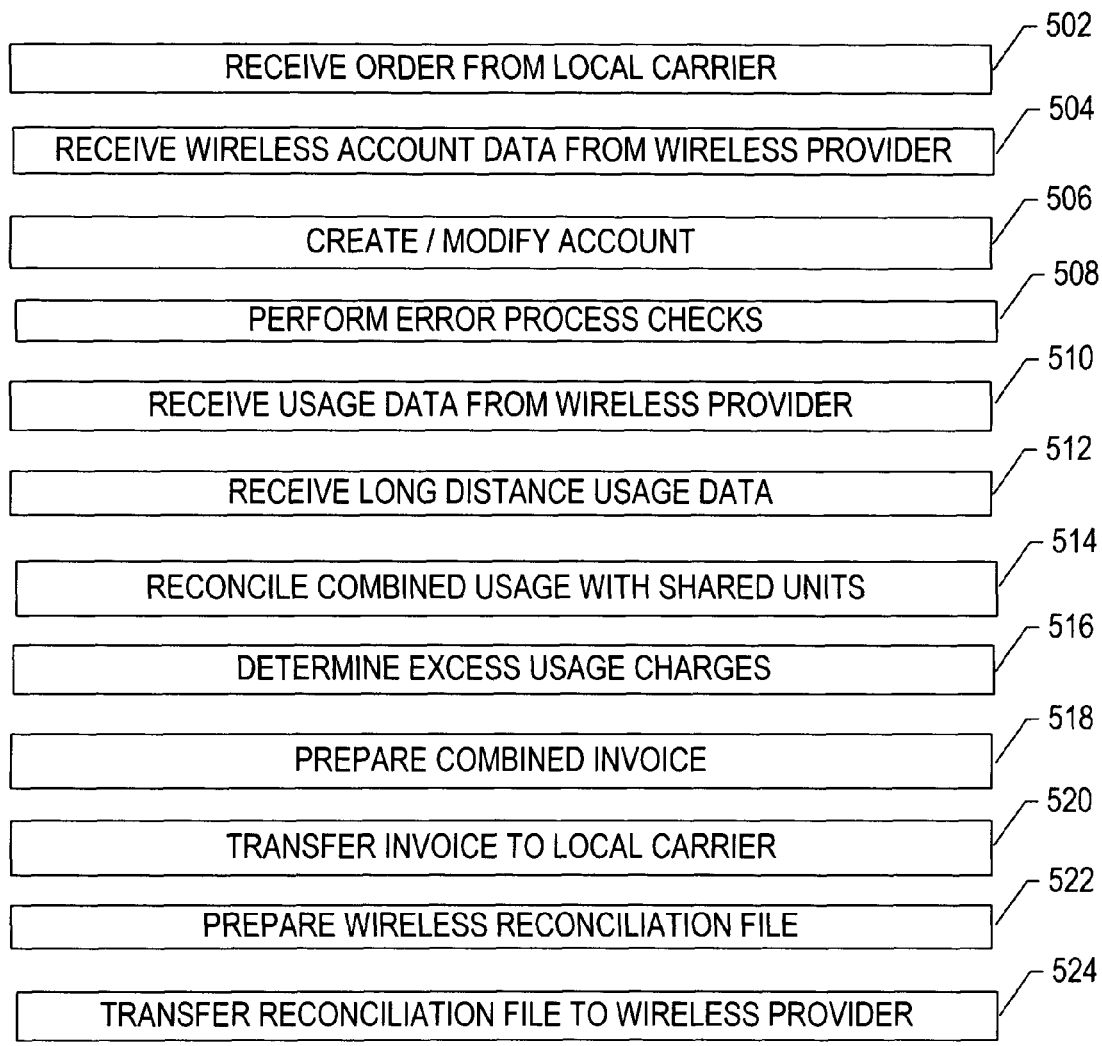

FIG. 5 depicts an exemplary method for managing an account associated with shared telecommunications units. In this exemplary embodiment, a long distance landline services provider may receive an order from a local exchange carrier, as shown in step 502. The order may include information and data associated with a subscriber and may identify a pricing plan that includes an allotment of shared telecommunications units. The long distance service provider may receive wireless account data from the wireless service provider, as shown at step 504.

The long distance service provider may then create or modify an account, as shown in step 506. This account may include subscriber data, the pricing plan, and the wireless account data. In one exemplary embodiment, the long distance service provider may perform error checks, as shown at step 508. Error checks may include interaction with the wireless service provider or manual manipulation of account records. These error checks may be used to improve accuracy of data used in pairing wireless and long distance accounts.

Once an account is established, the long distance service provider may receive usage data from the wireless service provider, as shown at step 510. The long distance service provider may also receive usage data associated with long distance service usage, as shown at step 512. The combined usage data may be reconciled with allocation of shared units, as shown in step 514. For example, the shared telecommunications units may be allocated to usage in the order in which the usage occurred. In alternate embodiments, the usage may be allocated according to business logic such as allocating one service usage first or preferentially allocating usage according to a formula. In cases in which the combined usage of telecommunications services exceeds the available allotment of shared telecommunications units, excess charges may be determined, as shown at step 516. These excess charges may, for example, include purchasing an additional allotment of service units, charging a common per unit rate according to a number of units used in excess of the shared allotment, or charging distinct per unit rates based on the amount and type of telecommunication service usage used in excess of the allotment of shared telecommunications units.

The long distance service provider may then prepare a combined invoice, as shown at step 518. This combined invoice may include an accounting of the usage allocated to the shared telecommunications units, charges for usage in excess of the allotted shared telecommunications units, and taxes. This combined invoice may be transferred to the billing entity, such as the local exchange carrier, as shown in step 520.

The long distance service provider may further prepare a reconciliation file indicating allocation of usage to the allotment of shared telecommunications units, charges for use in excess of the shared telecommunications units allotment, and/or payment data. This reconciliation file may then be transferred to the wireless service provider, as shown at step 524.

Figure 6:
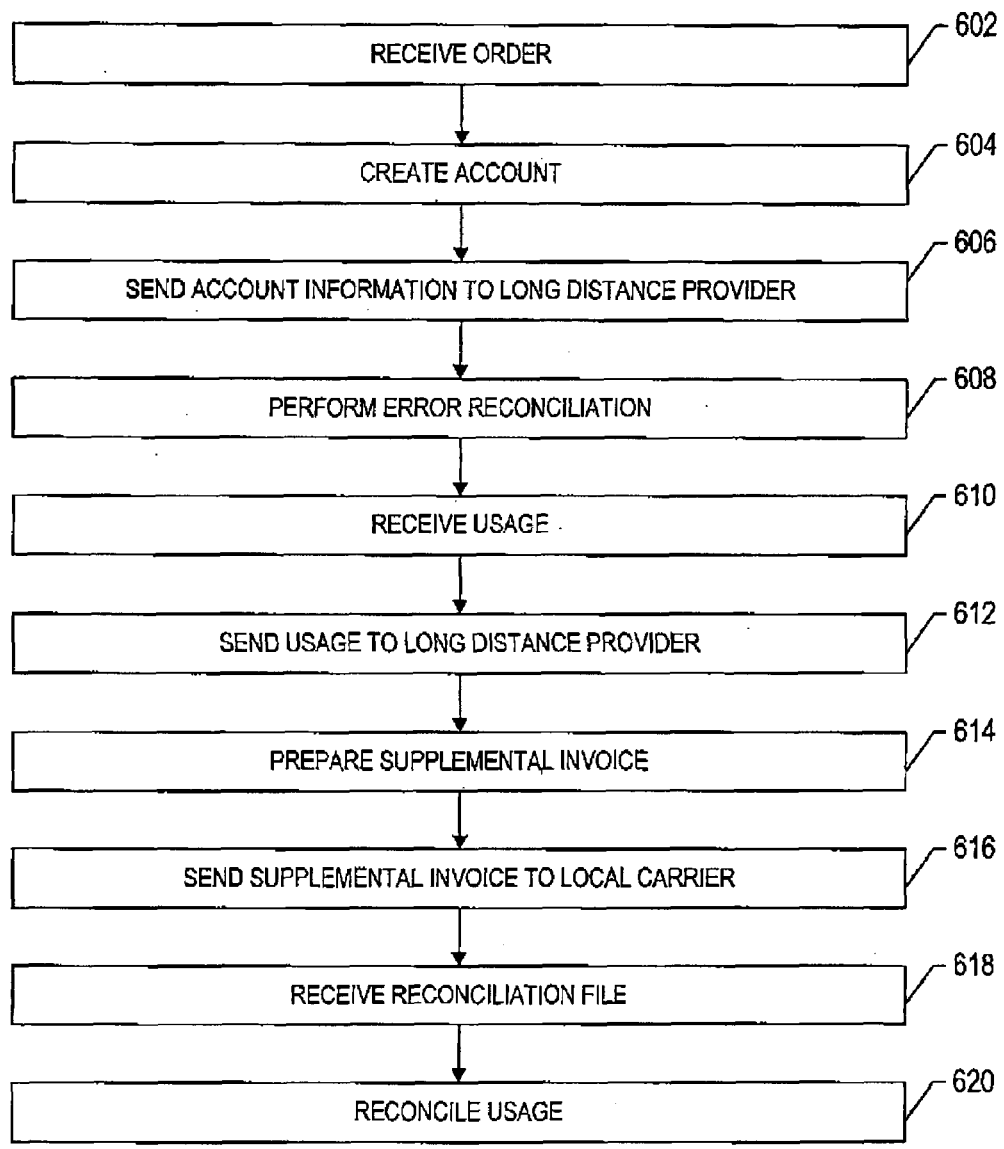

FIG. 6 depicts another exemplary method for managing an account with allotments of shared telecommunications units. A wireless service provider may, for example, receive an order, as shown in step 602. The order may include subscriber data and may indicate a pricing plan that includes an allotment of shared telecommunications units. The wireless service provider may create an account, as shown at step 604. The wireless service provider may send account information associated with the account to the long distance service provider, as shown at step 606. In conjunction with the long distance service provider, the wireless provider may perform error reconciliation, as shown at step 608.

Once an account is established, the wireless service provider may provide wireless service and receive usage data, as shown at step 610. The wireless service provider may then send usage data to the long distance service provider, as shown at 612.

The wireless service provider may prepare a supplemental invoice, as shown at step 614. The supplemental invoice may include charges not associated with the shared telecommunications units for uses such as equipment charges or taxes. In one exemplary embodiment, tax information may be sent to the long distance service provider for inclusion with the combined invoice. In another exemplary embodiment, the tax information may be included with the supplemental invoice. The supplemental invoice may then be sent to the local exchange carrier, as shown at step 616. The local exchange carrier may include this supplemental invoice in a combined bill sent to the subscriber.

The wireless service provider may also receive a reconciliation file, as shown at step 618. This reconciliation file may indicate allocation of usage to the allotment of telecommunications units, charges for uses in excess of the allotment of shared telecommunications units, and other information relating to the accounting of usage such as payment data. The wireless service provider may then reconcile its usage records using the reconciliation file, as shown at step 620.

Figure 7:
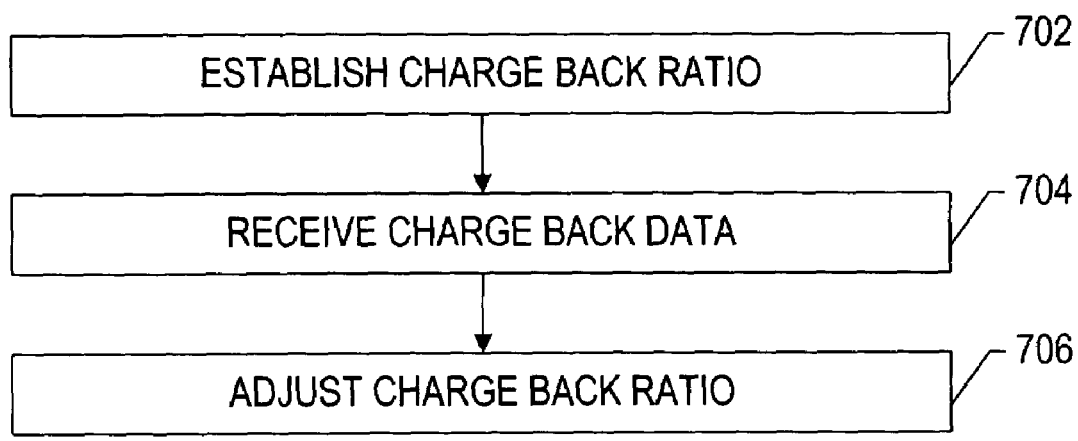

FIG. 7 depicts an exemplary method for accounting for uncollected payments. In one exemplary embodiment, uncollected payments are accounted for based on a statistical charge back ratio. A charge back ratio may be established, as shown at step 702. This charge back ratio may, for example, be based on historic payment statistics for telecommunications services. In one exemplary embodiment, money is transferred between the local exchange carrier and the long distance carrier based on the invoice amounts less a charge back based on the charge back ratio for both the long distance and wireless invoices. The long distance service provider then transfers money to the wireless service provider based on an agreement associated with the shared telecommunications pricing plan less a charge back amount based on the established charge back ratio.

Each entity may then receive charge back data, as shown at step 704, based on actual payment data associated with invoices. The charge back ratios may then be adjusted, as shown at step 706, for future monetary exchanges.

Figure 8:
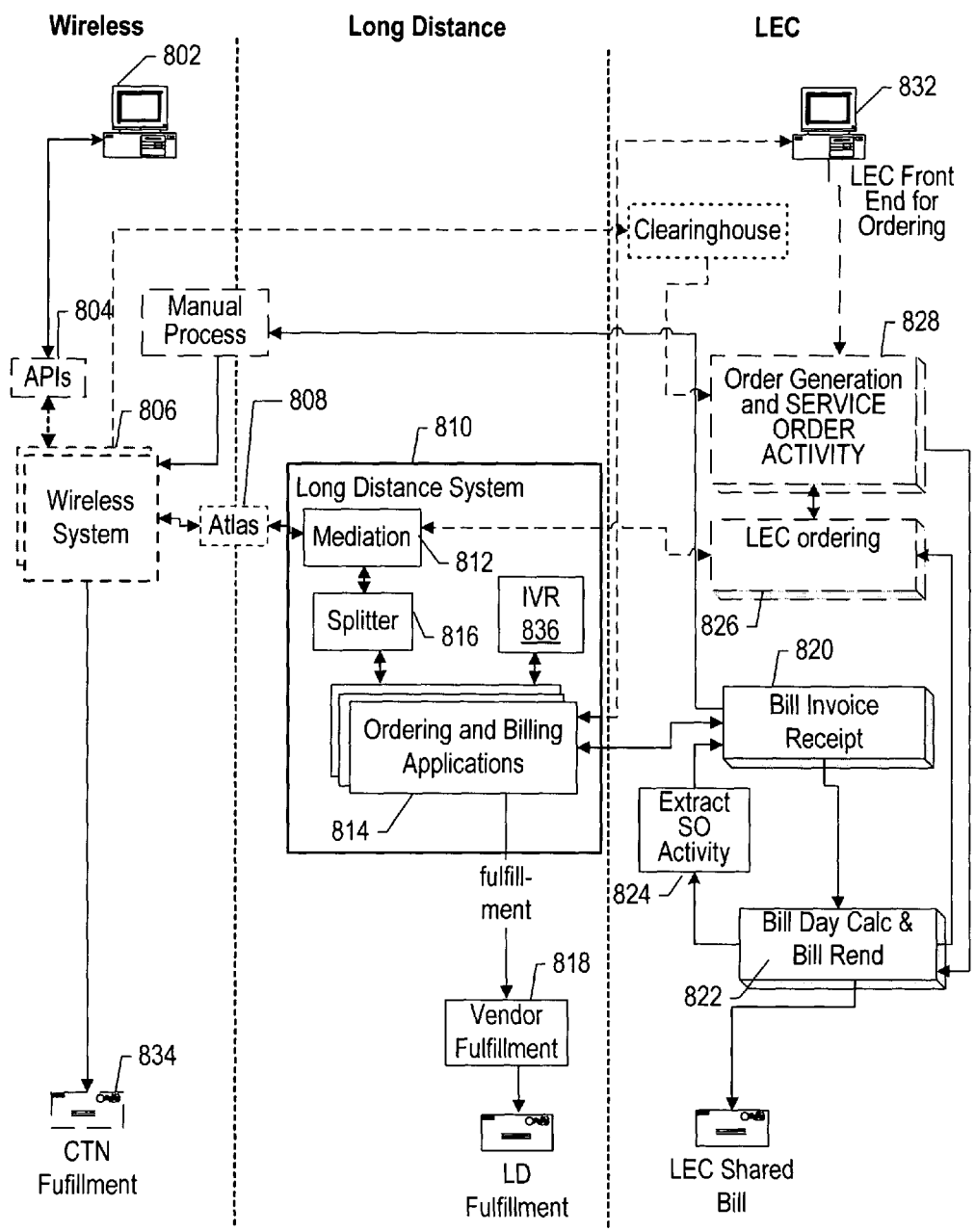
FIGS. 8 and 9 depict exemplary billing systems.

FIG. 8 depicts an exemplary system for managing telecommunications services associated with a pricing plan that includes shared telecommunications units. In this exemplary embodiment, the system interaction between an exemplary wireless provider, an exemplary long distance provider, and a exemplary local exchange carrier (LEC) are shown.

The Application Program Interfaces (APIs) 804 are application programs that enable data to be exchanged "realtime" between different application systems. The APIs 804 may, for example, include interfaces, such as for order information for Cellular Telephone Numbers (CTN) from the customer service representative screens 802 to the wireless ordering and billing system 806.

The ordering and billing system 806 may include interfaces such as the APIs to Customer Service Reps mentioned above. The ordering and billing system 806 may also send customer and ordering information to the CTN Fulfillment application 834, which send out a letter and/or equipment to the customer notifying them of their order. The ordering and billing system may also include handshake files, which are daily batch files between the wireless and LEC ordering systems that tell the LEC ordering systems that the account has ordered a shared minute price plan. In addition, the ordering and billing system 806 may include manual processes from LEC Bill Invoice Receipt 820. As the LEC customer changes the account status such as change of address or billing responsibility in the LEC systems, this information is sent in a report to the wireless provider. The wireless provider manually updates the customer information in the Ordering and Billing system 806.

ATLAS 808 communication server sends and receives data between the wireless provider's application and other applications. ATLAS 808 may include interfaces for Ordering and billing information (customer name, address, tax information, customers cellular usage, etc.) from the wireless and long distance mediation systems. ATLAS 808 may interface with erred ordering and billing information sent from long distance mediation system to the wireless provider system 806. ATLAS may also interface with billing settlement information between the wireless provider and the long distance provider.

The long distance provider system 810 provides ordering and billing for the long distance provider. The system may include a mediation system 812, long distance ordering and billing applications 814, and a splitter application or system 816. The mediation system 812 is an application that is part of the long distance ordering and billing system 810. The mediation system 812 receives records/files from external systems and performs validation of the data in each field of the records. The mediation system 812 also reformats data from various feeds into a standard format that is read by other long distance system applications. When records/files are sent out from the long distance system 812, the mediation system 812 formats these records/files that are sent to external applications. The mediation system 812 interfaces with ordering and billing information (customer name, address, tax information, customers cellular usage, etc.) from the wireless system 808 and 806; erred ordering and billing information that is sent from the long distance mediation system 810 to wireless system 806; and billing settlement information between the wireless provider and the long distance provider. The mediation system 812 formats data from various feeds into a standard format that is read by other long distance system applications.

The long distance ordering and billing applications 814 perform functions such as usage rating, bill calculation, bill formatting, and online customer data online that aggregate a customer's long distance and wireless usage/charges and formats a bill. The long distance ordering and billing applications 814 also allocate and send settlement information between the long distance provider and the wireless provider. The long distance system ordering and billing applications 812 interface with the mediation system 812 through the splitter 816. Splitter information includes information such as LEC ordering/account status information for a customer who has the shared minutes product. The ordering and billing applications 814 may send long distance bill invoices to the LEC to be printed as part of the LEC bill. Settlement information for these invoices is passed back and forth between the LECs and the long distance providers. The order and billing applications 814 also send customer and ordering information to the long distance vendor fulfillment system 818, which sends out a letter to the customer notifying them of their order.

The splitter 816 is a long distance application that receives LEC ordering information and sends this order information to the correct physical databases where the customer accounts reside. For consumer accounts, the accounts may exist on several different databases or instances based on region. The splitter 816 interfaces with LEC orders consisting of CARE (customer order status on their long distance carrier) and ECARE (customer choice of Price Plan or Promotion) that are sent, for example, several times a day from the LEC ordering systems into the splitter 816. Splitter information is sent to ordering and billing applications 814 to establish new accounts and/or maintain information on an account.

An interactive voice response (IVR) system 836 may also communicate with the ordering and billing applications 814. Customers may call the IVR system 836 to receive account information such as usage and remaining shared minutes.

The long distance vendor fulfillment system 818 receives ordering information from the long distance system 810 and prints/sends the Welcome letter/Fulfillment regarding the shared minutes product to customers.

In the LEC systems, the Bill Day Calculation and Bill Rendering system 822 is a LEC billing systems application that calculates the bill charges that will appear on a customer's bill and formats the bill. The system 822 creates the billing file to be printed that includes LEC and Long Distance charges (LEC Shared Bill). The system 822 sends information to the Extract SO Activity system 824 that communicates to the wireless provider changes to the customer status in the LEC billing systems. Service Order activity is sent that impacts a customer account status and calculation of a customer's charges. The Bill Invoice Receipt 820 sends the bill invoices received from long distance provider and sends them to Bill Day Calc. and Bill Rend system 822 for inclusion in the customer's bill. In this manner, a customer's charges appear on their LEC Shared Bill.

The Extract SO Activity system 824 is a LEC service order activity application that keeps the LEC Bill Invoice Receipt systems 820 apprised of a customer's status. The system 824 receives customer status information from the LEC Ordering applications and sends information it receives into LEC Invoice Receipt systems 820 for customer status The Bill Invoice Receipt system 820 is the LEC system that processes invoices sent by the Long Distance provider's applications. The system 820 receives customer status information from the LEC Extract SO Activity applications 824. The Bill Invoice Receipt system 820 sends the bill invoices received from long distance system to Bill Day Calc. and Bill Rend system 822 on the customer's bill day so all of a customer's charges appear on their LEC Shared Bill. The system 820 also sends a handshake file to the wireless provider to notify the wireless provider of changes in the customer's account status in the LEC Billing system.

The LEC Ordering system 826 is a LEC application that transforms a customer's shared minutes order information to outputs to the long distance provider. The Ordering system 826 sends customer's order information to the long distance provider and receives confirmation of the order receipt from the long distance provider. The ordering system 826 also sends customer's order information to the Extract SO Activity application 824 in order to pass on customer's status activity to the wireless provider in the handshake file.

The Order Generation and Service Order Activity system 828 are LEC applications that generate LEC customer's shared minutes order information into an order for both long distance and wireless services along with establishing a LEC combined bill. The system 828 receives wireless CTN order information and LEC customer service representative order information.

Figure 9:
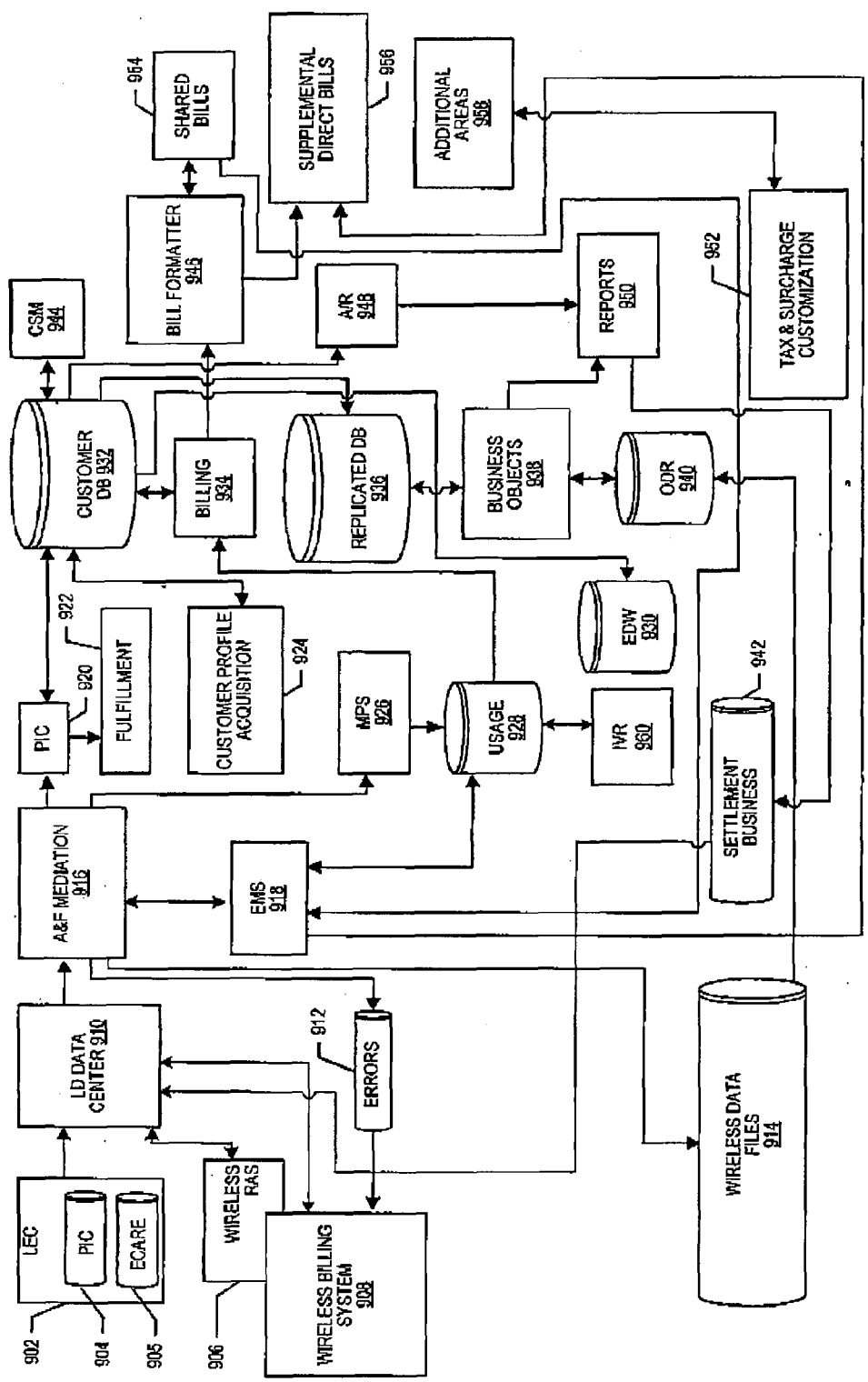

FIG. 9 depicts a telecommunications system for managing accounts having an associated pricing plan that includes shared telecommunications services. The system includes a local exchange carrier (LEC) system 902, systems associated with a wireless provider, and various systems associated with a long distance service provider.

The LECs ordering systems 902 sends order information for shared minute products from the various LEC data centers to the long distance data center 910. The primary interexchange carrier (PIC) record/file 904 includes information regarding the customer's account status for their Long Distance Carrier. ECARE 905 is the record/file information on the customer's shared minute price plan and/or promotion.

The Wireless Revenue Accounting Systems (RAS) 906 is a system that tracks financials internally and between the wireless providers external interfaces. The Wireless Billing System 908 communicated ordering and billing information such as customer name, address, tax information, and customers cellular usage from the wireless provider to the LD Data Center 910. The Wireless Billing System 908 may also receive errored ordering and billing information that is sent from LD Mediation system 916 to Wireless Billing System 908.

The LD Data Center 910 sends and receives files and is the site of the LD billing and ordering system as exemplified by the various applications and systems. The LD Data Center 910 receives ordering and billing information such as customer name, address, tax information, and customers cellular usage from the wireless provider systems and the LECs. The LD Data Center 910 also sends this information into the long distance billing systems.

The errors 912 include ordering and billing errors related to wireless customer profile records such as customer name, address, and tax information and wireless usage.

The Wireless Data Files 914 are the original source data files for data such as usage, customer profiles, errors, and settlements, exchanged between LD and wireless providers that are stored on a Data Repository (ODR) 940 for the purpose of extracting report data and audit/control. The wireless data files 914 are sent to the ODR 940. The wireless data files 914 may be received from the LD Data Center, or may be the original wireless customer profile, usage, error records/files.

The Acquisition and Format Mediation system 916 is an application that is part of the LD ordering and billing system. Mediation system 916 takes in records/files from external systems and performs validation of the data in each field of the records. Mediation system 916 also reformats data from various feeds into a standard format that is read by other LD applications. When records/files are sent out from the long distance provider, Mediation system 916 formats these records/files that are sent to external applications. The Mediation system 916 receives ordering and billing information such as customer name, address, tax information, and customers cellular usage, from the wireless provider through the LD Data Center 910. Errored ordering and billing information 912 is sent from the A& F Mediation 916 to the wireless provider. The Mediation system 916 formats data from various feeds into a standard format that is read by other LD applications. The Medication system 916 also communicates billing settlement information between the wireless and long distance provider.

The Error Management System (EMS) 918 is an application that is part of the LD ordering and billing system. The EMS 918 corrects usage errors and billing invoices that are rejected by the LEC Invoice Ready systems. As mentioned above, errors for usage and invoice correction are processed between EMS 918 and Usage and Shared Bill (LEC Invoice Ready (IR) system).

The PIC application 920 is an application that is part of the LD ordering and billing system. PIC 920 is the module that processes PIC/ECARE files for the LECs information regarding a customer's account and product status. The PIC application 920 sends Fulfillment data to the customer for new account and/or new products. The PIC application 920 also updates the LD ordering and billing system customer database (932) with customer account and product information.

The Fulfillment system 922 prints the Welcome letter sent to customers for new account and/or product information. The fulfillment system 922 sends Fulfillment letter to the customer for new account and/or new products.

The Customer Profile Acquisition application 924 is an application that is part of the LD ordering and billing system. This application 924 processes and retains wireless customer information such as customer name, address, and tax information, that is maintained in the LD ordering and billing system customer database 932.

The Message Processing System (MPS) 926 is an application that is part of the LD ordering and billing system. This system 926 processes and rates the shared minute usage (both LD and wireless). The MPS 926 receives usage detail from the A&F Mediation application 916 and stores the rated (and unrated) detail and summarized usage in Usage Tables (928).

The Usage database 928 stores the rated (and unrated) detail and summarized usage. The Enterprise Data Warehouse (EDW) 930 is an enterprise database application that stores copies of the LD ordering and billing system data that is used for marketing reports and compensation. The EDW 930 receives copies of ordering and billing data from LD systems.

An interactive voice response (IVR) system 960 may also communicate with the usage database 928. Customers may call the IVR system 960 to receive account information such as usage and remaining shared minutes.

The Customer database 932 is a set of tables and system software that stores the LD ordering and billing data. It interfaces with various LD applications including the CSM 944, PIC 920, EDW 930, and A/R sytem 948.

The Billing system 934 is an application that is part of the LD ordering and billing system. This system 934 calculates the monthly and recurring charges, along with additional billing calculations, for the shared minute product. The billing system 934 processes the rated detail and summarized usage from the Usage Tables 928.

The Replicated DB 936 is a copy of the Customer DB 932 for disaster recovery purposes. It is also a source for Reports 950 data that are formatted by the Business Object application 938. The Replicated DB 936 is accessed by the Business Objects application 938 for reports data.

The Business Objects 938 is a standard reporting application that is used to format reports. The business objects 938 access data stored in various data repositories (EDW 930, ODR 940, and ReplicatedDatabase 936).

The Operational Data Repository (ODR) 940 stores various data records/files, such as the original/raw data records sent/received prior to any manipulation or reformatting is done to help with audit and control functionality. The ODR 940 interfaces with the Business Object 938 for reports and storing data records/files.

The Settlement Business 942 includes various data records/files that contain share minute billing and settlement information that is calculated in the LD system and is sent to WIRELESS RAS system 906 to book revenues between the two companies. The settlement business 942 receives revenue reports that originate from the LD A/R Application 948. Settlement information is sent the LD Data Center 910 and then on to the Wireless RAS system 906.

The Customer Service Module (CSM) 944 is an application that is part of the LD ordering and billing system that is the online tool for Customer Service Reps to view data stored in the Customer DB 932 and usage tables 928.

The Bill Formatter 946 is an application that is part of the LD ordering and billing system that formats the shared minute charges for the LEC Shared bill invoices and also to a Direct Bill format. The bill formatter 946 interfaces with the LEC Shared Bill Invoice Ready (IR) systems and to the Supplemental Direct Bills print vendor.

The Accounts/Receivable application 948 is an application that is part of the LD ordering and billing system that books the shared minute revenue. It interfaces with the Customer DB 932 and the Reports module 950.

The Reports module 950 produces financial reports from data stored in LD ordering and billing system. It interfaces with the A/R application 948. Data is sent to the Wireless RAS system 906.

The Tax & Surcharge Customization 952 is a process that allows either the LD or the wireless provider to manipulate the standard data returned from the vendor tax and surcharge software.

The Shared Bill 954 is sent to the LEC Invoice Ready systems that include the LD invoices as part of the LEC Shared Bill. The Supplemental Direct Bill 956 is a direct bill sent to a customer when the LEC Invoice Ready system will not accepts the LD invoice. The Additional Areas 958 are associated with establishing a bill relationship with the wireless provider such as Price Plan creations, testing, and table updates.

Figure 10:
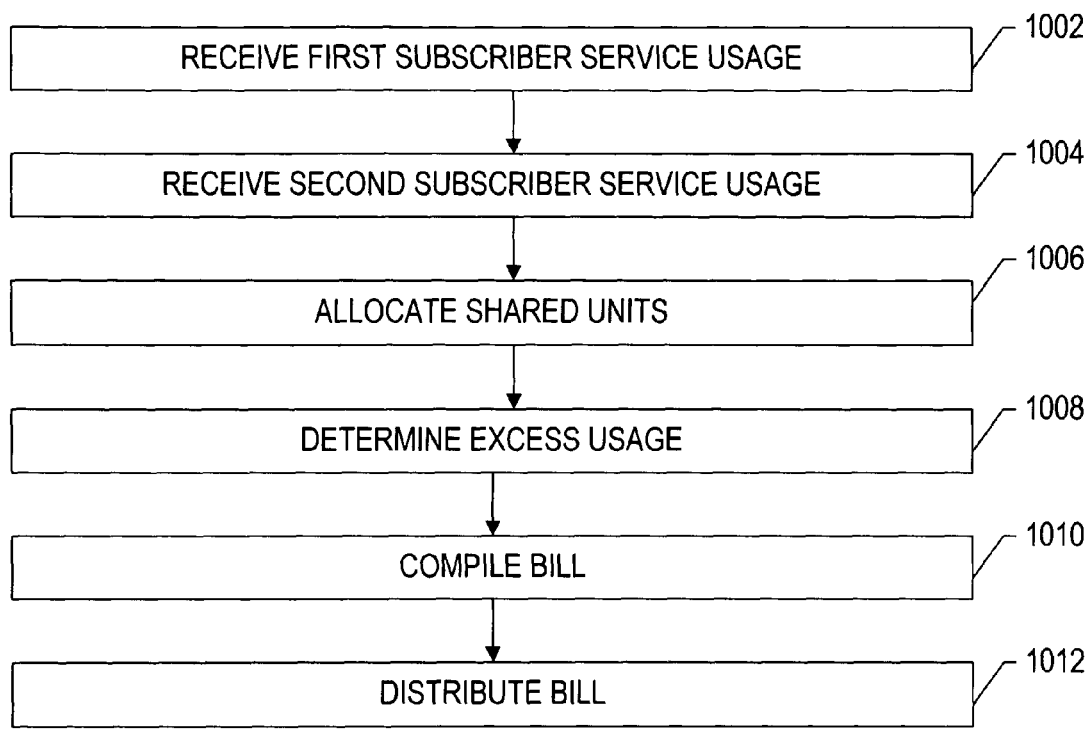
FIG. 10 depicts an exemplary method for providing an invoice.

FIG. 10 depicts an alternate embodiment in which a single entity accounts for service usage and provides a bill. The entity may receive a first subscriber service usage, as seen in step 1002, and second subscriber service usage, as seen at step 1004. The entity may allocate shared units to the usage, as seen at step 1006, and determine charges for uses in excess of the allotted shared units, as seen at step 1008. The entity may then compile a bill, as seen at step 1010, and distribute the bill, as seen at step 1012.

Figure 11:
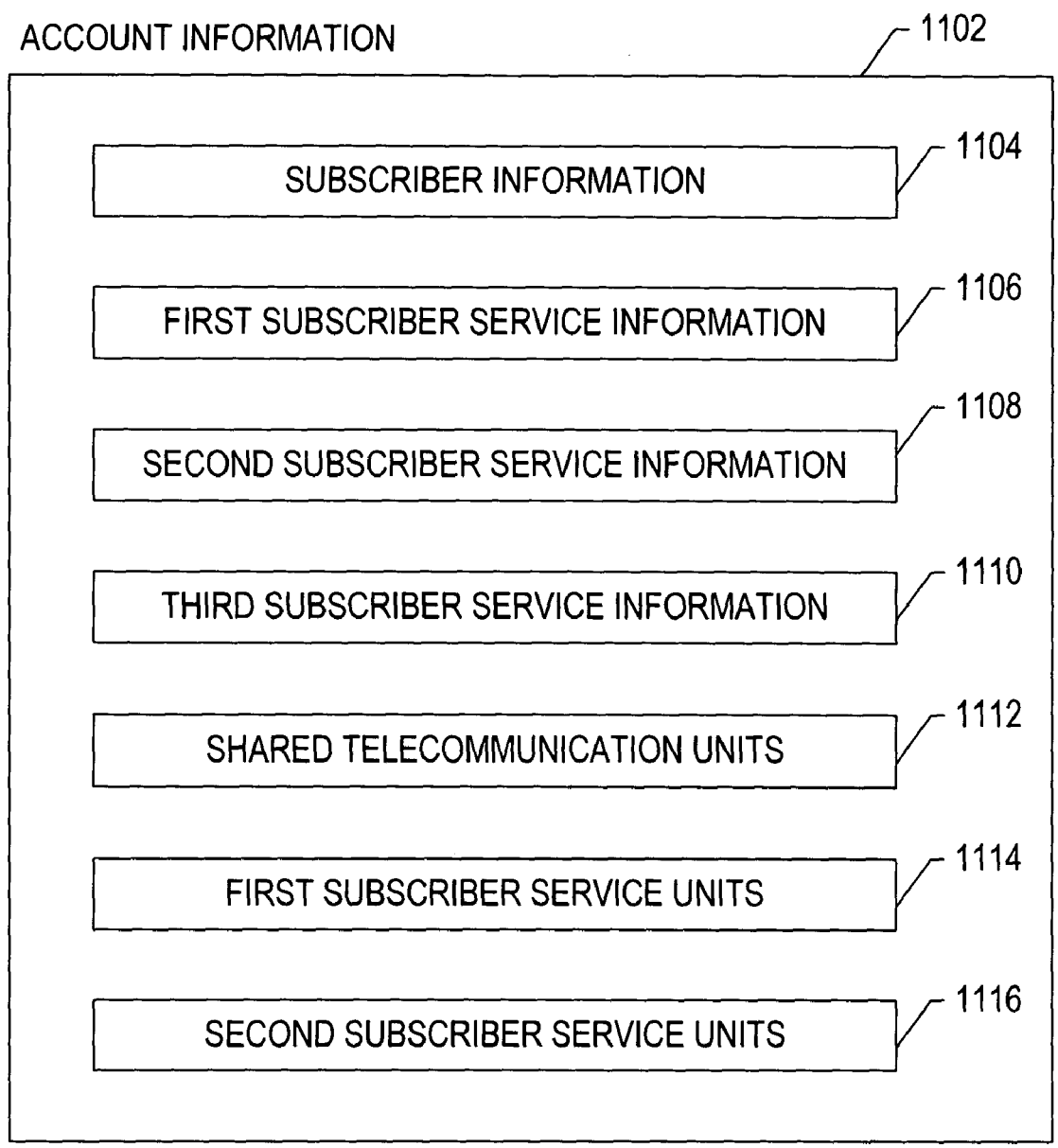
FIG. 11 illustrates an exemplary account.

FIG. 11 depicts an exemplary shared account 1102. The account may, for example, be stored in a database or memory. The account 1102 may include subscriber information 1104, first subscriber service information 1106, second subscriber service information 1108, third subscriber service information 1110, shared telecommunications units 1112, first subscriber service units 1114, and second subscriber service units 1116.

The subscriber information 1104 may include data associated with the subscriber such as identifiers, names, addresses, phone numbers, contact information, credit information, and information indicating the service to which the subscriber has subscribed. The first subscriber service information 1106 may include information specific to the first subscriber service and the second subscriber service 1108 may include information specific to the second subscriber service. The subscriber service information may for example include account numbers or telephone numbers associated with the subscriber service. This information may be useful in identifying usage data associated with the account. For example, the first subscriber service 1106 may be a long distance landline service. The first subscriber service 1106 may include information such as the phone number, service provider, and rates associated with usage in excess of the allotted shared telecommunications units.

The account 1102 may also include a third subscriber service information 1110. This information may, for example, be associated with a third subscriber service which may or may not be associated with or have use allocated to the allotted shared telecommunications units. For example, the third subscriber service may be a local landline service that is charged at a flat rate. Alternately, the third subscriber service may be a calling card service that may be billed in conjunction with the shared telecommunications units. In a further embodiment, the third subscriber service may be an Internet or broadband service that may or may not utilize the allotment of shared telecommunications units. In the case of the broadband or Internet service, the subscriber service information may include user names and passwords, network access information, and computer equipment information.

The account 1102 may further include one or more allotments of shared telecommunications units 1112. The allotments of shared telecommunications units 1112 may be allocated to usage of one or more of the telecommunications services. For example, telecommunications units from the allotment of shared telecommunications units may be allocated to usage of long distance and wireless phone service. The allotment may be further subdivided into allotments that may be utilized during peak or off-peak time periods. In an alternate embodiment, an allotment of shared telecommunications units may be provided for usage at any time. Once this allotment is exhausted, an additional allotment may be provided for usage at off-peak time periods. In a further embodiment, an additional allotment may be provided for unshared usage, for example, a first set of units 1114 may be provided for usage in excess of the shared telecommunications units for a first subscriber service and a second set of units 1116 may be provided for usage of a second subscriber service in excess of shared telecommunications allotment 1112.

In one exemplary embodiment, the account may be a billed account. Service charges may occur on a reoccurring basis such as monthly after the service has been provided. In another embodiment, the account may be partially prepaid in which anticipated charges are paid in advance and unanticipated charges are billed after the service is provided. In a further embodiment, the account may be prepaid and service discontinued when the account balance or shared units are full allocated or used.

Figure 12:
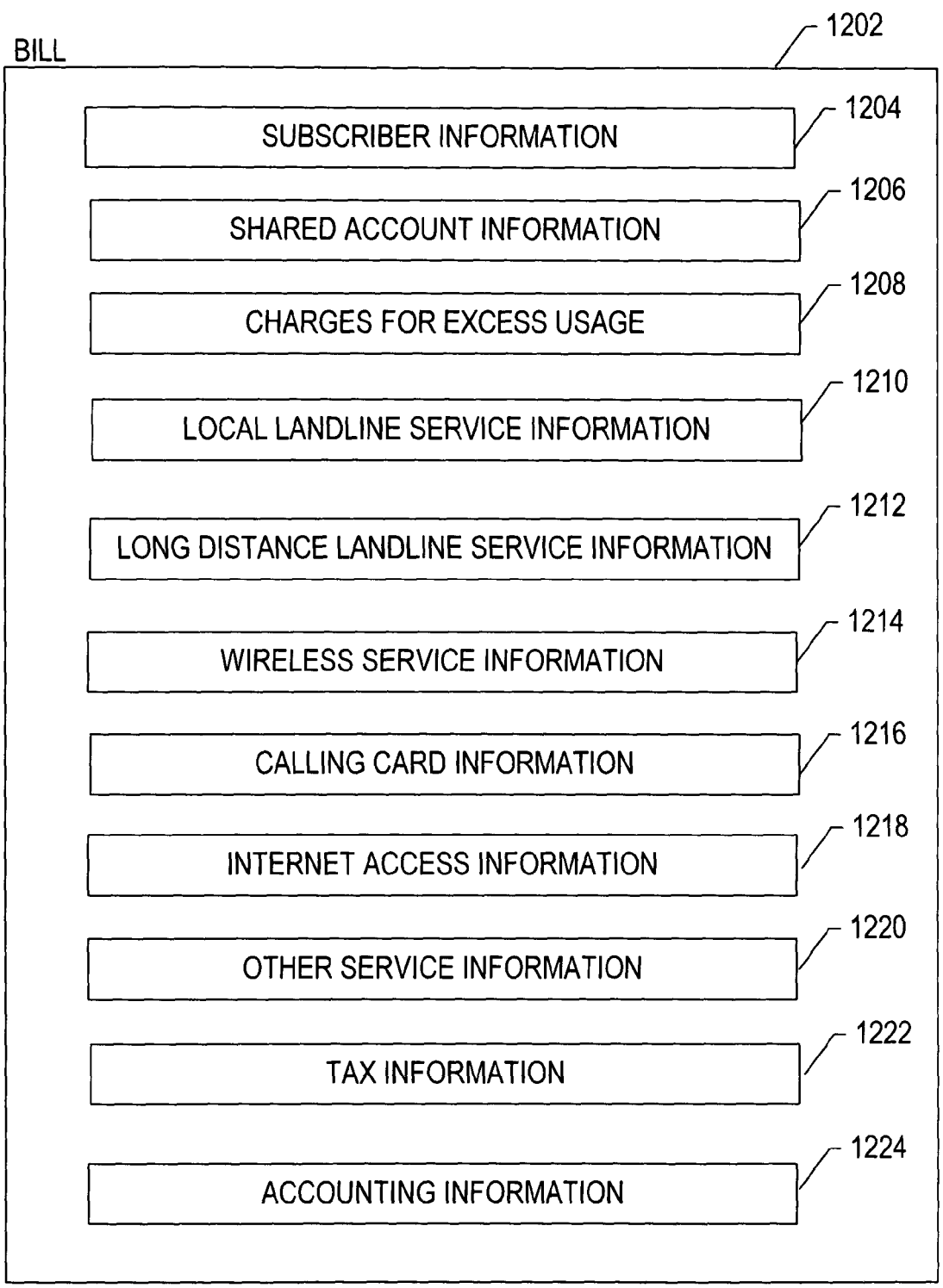
FIG. 12 illustrates an exemplary bill.

FIG. 12 depicts an exemplary embodiment of a bill or invoice 1202. The bill or invoice 1202 may include subscriber information 1204, shared account information 1206, charges for excess usage 1208, local landline service information 1210, long distance landline service information 1212, wireless service information 1214, calling card information 1216, internet access information 1218, other service information 1220, tax information 1222, and accounting information 1224.

The subscriber information 1204 may be, for example, information identifying the subscriber or subscribers such as names, account numbers, addresses, and phone numbers. The shared account information 1206 may, for example, include information about which telecommunications services are included in the shared accounts, allocation of usage of those services that draw from the allotment of shared telecommunications units, allocation totals, unused portions of allotted units, and other information associated with shared telecommunications units such as how many units and what charges are incurred to secure those units for a period of time. In one exemplary embodiment, the invoice bill may include as summary section identifying an amount of allotted units, an amount of allocated or used units, and a charge summary.

The invoice or bill 1202 may further include charges for usage in excess of the allotted shared telecommunications units. These excess charges 1208 may, for example, enumerate or identify charges based on a per unit cost, charges for additional allotments of shared units, or charges associated with usage of individual services at a rate specific to that individual service for use in excess of the shared telecommunications units.

The bill or invoice may further include local landline service information 1210. This local landline service information may include, for example, charges associated with the local landline service, charges associated with additional features provided by the local landline service provider, and other information associated with local landline service.

The long distance landline service information 1212 may include a listing of phone calls made including data such as to call destination and length of call. The long distance landline service information 1212 may further include information associated with charges not included in the shared account information 1206 or the charges for excess usage 1208.

The invoice 1202 may further include wireless service information 1214. The wireless service information 1214 may include a listing of wireless calls including data associated with to call length and destination.

Similar information may be included in the calling card information 1216 for calls made using a calling card. Charges may also be provided in the calling card information 1216 in the event that the calling card service is not attached to those services utilizing the allotment of shared telecommunications units.

The Internet access information 1218 may include data associated with charges incurred for Internet access such as flat fees and taxes, equipment rentals or per usage access charges associated with Internet access.

In addition, other service information 1220 may be included. This other service information may include charges not previously shown in association with other services, such as equipment charges or other services. In addition, other services not specifically mentioned above may be incorporated into a bill such as cable data and television services. Tax information 1222 may be included in conjunction with each of the various services or may be enumerated or identified separately. Taxes may be imposed separately and distinctly for each service such as local, long distance, and wireless services. Furthermore, each of these services may be taxed under different taxing jurisdictions.

Furthermore, the bill 1202 may include accounting information 1224. This information may, for example, identify previous charges, previous payments and show a total amount due. The bill or invoice 1202 may include additional information and may be formatted in a manner that would be convenient for the customer.

Figure 13:
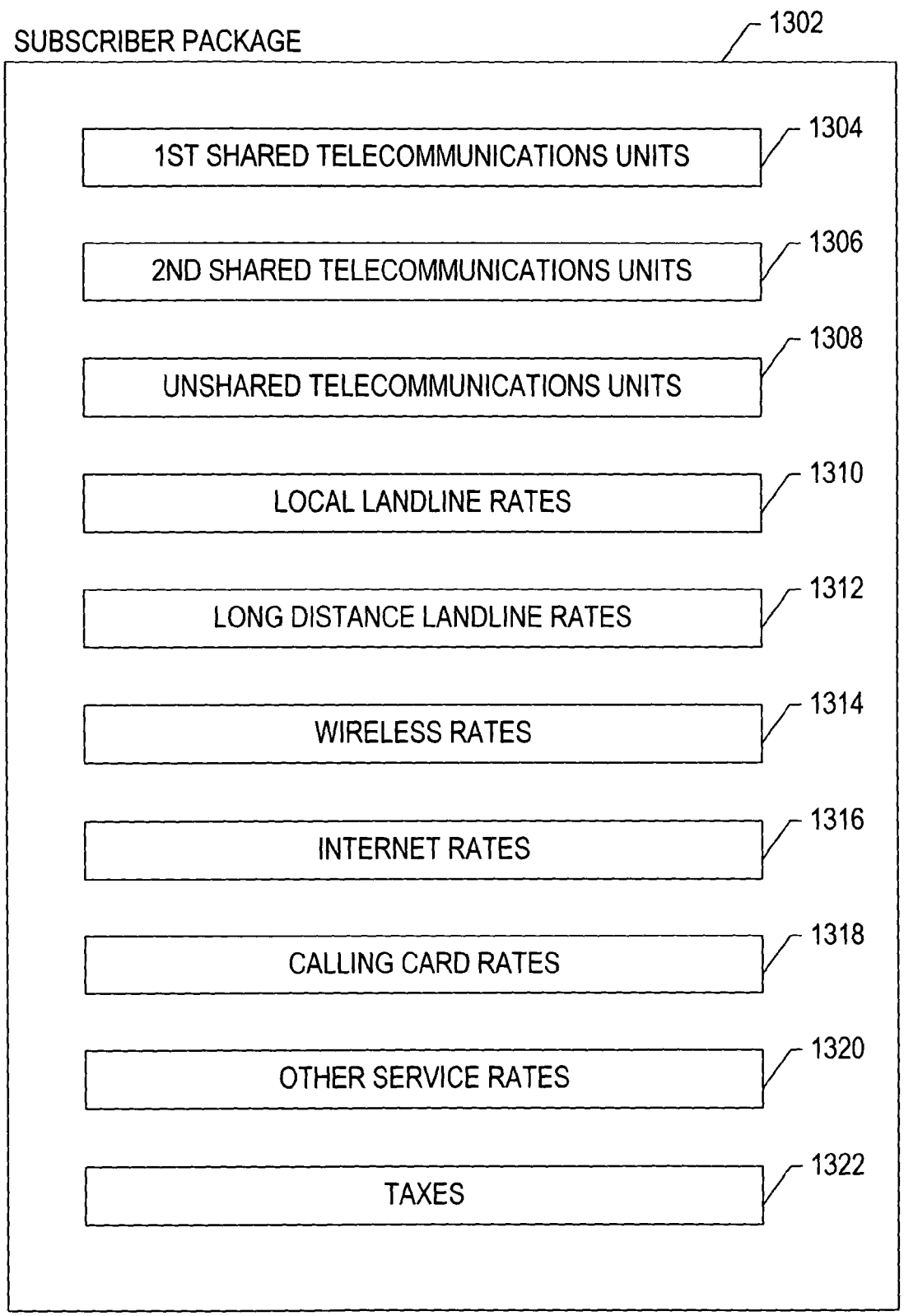
FIG. 13 depicts an exemplary subscriber package.

FIG. 13 depicts an exemplary embodiment of a subscriber package 1302. The subscriber package 1302 includes first shared telecommunications units 1304, second shared telecommunications units 1306, an allotment of unshared telecommunications units 1308, landline rates 1310, long distance landline rates 1312, and wireless rates 1314. The subscriber package 1302 may also include Internet rates 1316, calling card rates 1318, other service rates 1320, and taxes 1322.

In this exemplary embodiment, a subscriber package 1302 includes a first allotment of shared telecommunications units 1304. This first allotment of shared telecommunications 1304 may, for example, be units for allocation to usage that occurs at any point in time or at peak time periods. The second allotment of shared telecommunications units 1306 may, for example, be allocated for usage in excess of the first shared telecommunications units allotment 1304 or for usage of telecommunications service at off-peak periods of time.

In one exemplary embodiment, an allotment of unshared telecommunications units 1308 may be provided for allocation to usage of one of the telecommunications services associated with the shared telecommunications units. For example, units in the allotment of unshared telecommunications units may be allocated to usage in excess of the allotment of shared telecommunications units or for usage not allocated from the shared telecommunications units.

In addition, the subscriber package 1302 may include rate information associated with local landline services 1310, long distance landline rates 1312 and wireless usage rates 1314. The local landline rates 1310 may, for example be flat fees associated with providing a local landline service and selected features associated with that service. The long distance landline rates 1312 and wireless usage rates 1314 may, for example, be rates applied to usage in excess of the allotments of shared telecommunications units. In an alternate embodiment, a common usage rate may be applied to excess usage.

In one exemplary embodiment, the subscriber package 1302 may include subscriptions to other services, such as calling card services, Internet services, and various other services. For example, the calling card services may draw from the shared telecommunications units, 1304 and 1306. Alternately, a calling card rate 1318 may be provided. Similarly, an Internet usage rate 1316 may be provided and may include flat fees for broadband Internet services or per unit rates for internet service.

The subscriber package 1302 may include other service rates 1320, such as equipment rental and other telecommunications services. Furthermore, the subscriber package 1302 may include tax information 1322. Taxes may be imposed based on jurisdictions and services.

In a particular embodiment, the disclosure is directed to a telecommunications billing system. The telecommunications billing system includes an interface, a customer database, a usage database and a billing module. The interface is configured to receive subscription data associated with a subscription and a first set of telecommunications service usage data associated with a first telecommunications service. The subscription data identifies a pricing plan. A pricing plan includes an allotment of shared telecommunications units for use in connection with at least one of the first telecommunications service and a second telecommunications service. The customer database is configured to store customer information associated with the subscription. The customer information includes the subscription data identifying the pricing plan. The usage database is configured to store the first set of telecommunications service usage data and a second set of telecommunications service usage data associated with the second telecommunications service. The billing module is configured to access the usage database and the customer database. The billing module is configured to generate billing data utilizing the allotment of shared telecommunications units, the first set of telecommunications service usage data and the second set of telecommunications service usage data.

In another embodiment, the disclosure is directed to a method of providing a shared telecommunications account. The method includes receiving order data, receiving a first set of telecommunications service account data from a first telecommunications service provider, and creating a telecommunications account. The order data identifies a pricing plan. The pricing plan has an associated allotment of shared telecommunications units for use in connection with at least one a first telecommunications service and a second telecommunications service. The first set of telecommunications service account data is associated with the order data and is also associated with the first telecommunications service. The telecommunications account provides the allotment of shared telecommunications units usable for the first telecommunications service and the second telecommunications service.

In a further embodiment, the disclosure is directed to a method of providing an invoice to a telecommunications subscriber. The method includes receiving an invoice file, preparing an invoice, and sending the invoice to a subscriber. The invoice file is received from a first telecommunications service provider. The invoice file identifies usage of shared telecommunications units applied in connection with a first telecommunications service and a second telecommunications service. The invoice is prepared based upon information from the invoice file.

In a further embodiment, the disclosure is directed to a method of establishing a telecommunications service. The method includes receiving order data, establishing an account, and sending account information to a second subscriber service provider. The order data identifies a price plan. The price plan includes an allotment of shared telecommunications units. The shared telecommunications units are available for use in connection with a first subscriber service and a second subscriber service. The first subscriber service is distinct from the second subscriber service. The account includes account information and is established in response to receiving the order data. The account is associated with the first subscriber service. The second service provider provides the second subscriber service.

In a particular embodiment, the disclosure is directed to a method of providing a bill to a telecommunications subscriber. The method includes distributing a bill using shared account information to the telecommunications subscriber. The shared account information identifies shared telecommunications units used in connection with a first subscriber service and a second subscriber service. The first subscriber service is distinct from the second subscriber service.

In another embodiment, the disclosure is directed to a telecommunications subscriber service package. The telecommunications subscriber service package includes an allocation of shared account units. At least a portion of the allocation of shared account units is available for use in connection with a first subscriber service and a second subscriber service. The first subscriber service is distinct from the second subscriber service.

In a particular embodiment, the disclosure is directed to an account. The account includes computer readable memory and account information stored in the computer readable memory. The account information identifies a set of shared telecommunications units available for use in connection with at least one of a first subscriber service and a second subscriber service. The first subscriber service is distinct from the second subscriber service.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A telecommunications billing system comprising:
   at least one server configured to interpret at least two file types, a first file type of the at least two file types including subscription data associated with a subscription, the subscription data identifying a pricing plan, the pricing plan including an allotment of shared telecommunications units for use in connection with at least a first telecommunications service and a second telecommunications service, a second file type of the at least two file types including a first set of telecommunications service usage data associated with the first telecommunications service;
   a customer database configured to store customer information associated with the subscription, the customer information including the subscription data identifying the pricing plan;
   a usage database configured to store the first set of telecommunications service usage data and a second set of telecommunications service usage data associated with the second telecommunications service; and
   a billing module configured to access the usage database and configured to access the customer database, the billing module configured to generate billing data utilizing the allotment of shared telecommunications units, the first set of telecommunications service usage data, and the second set of telecommunications service usage data;
   wherein the first telecommunications service and the second telecommunications service are provided by different operating entities; and
   wherein the billing module calculates excess charges when cumulative usage of the first set of telecommunications service usage data and usage of the second set of telecommunications service usage data exceeds the allotment of shared telecommunications units.

2. The telecommunications billing system of claim 1, wherein the first telecommunications service is a wireless telecommunications service and the second telecommunications service is a long distance service.

3. The telecommunications billing system of claim 1, further comprising a bill formatter configured to access the billing module and configured to prepare at least part of an invoice utilizing the billing data.

4. The telecommunications billing system of claim 1, further comprising an error handling system configured to reconcile subscription data.

5. The telecommunications billing system of claim 1, further comprising a settlement system configured to transfer settlement reports to a provider of the first telecommunications service.

6. The telecommunications billing system of claim 5, further comprising a revenue tracking system configured to access the customer database and configured to access the settlement system, the settlement reports including revenue data generated by the revenue tracking system.

7. The telecommunications billing system of claim 1, wherein shared telecommunications units are allotted in conjunction with a monthly charge.

8. The telecommunications billing system of claim 1, wherein the billing module includes taxation data associated with the first telecommunications service in the billing data.

9. The telecommunications billing system of claim 1, further comprising an interactive voice response system configured to provide account data associated with the allotment of shared telecommunications units.

10. A method of providing a shared telecommunications account, the method comprising:
    receiving order data, the order data identifying a pricing plan, the pricing plan having an associated allotment of shared telecommunications units for use in connection with at least one of a first telecommunications service and a second telecommunications service;
    receiving a first set of telecommunications service account data from a first telecommunications service provider, the first set of telecommunications service account data associated with the order data and associated with the first telecommunications service;
    creating a telecommunications account to provide the allotment of shared telecommunications units, the telecommunications account being associated with the first telecommunications service and the second telecommunications service, wherein the first telecommunications service and the second telecommunications service are provided by different operating entities;
    receiving a first set of telecommunications service usage data from the first telecommunications service provider; and
    determining excess usage charges when a combined usage of the first telecommunications service and of the second telecommunications service exceeds the allotment of shared telecommunications units.

11. The method of claim 10, wherein the first telecommunications service is a wireless telecommunications service and wherein the second telecommunications service is a landline service.

12. The method of claim 11, wherein the landline service includes a long distance telecommunications service.

13. The method of claim 10, further comprising allocating shared telecommunications units usage associated with the first telecommunications service and the second telecommunications service.

14. The method of claim 13, further comprising preparing a combined invoice based on the allotment of shared telecommunications units.

15. The method of claim 14, further comprising communicating the combined invoice to a third telecommunications service provider.

16. The method of claim 15, wherein the third telecommunications service provider is a local exchange carrier.

17. The method of claim 13, further comprising preparing a reconciliation report associated with the allotment of shared telecommunications units and sending the reconciliation report to the first telecommunications service provider.

* * * * *